H. C. ODENRIDER.
EQUALIZER.
APPLICATION FILED JUNE 8, 1912.
1,060,013.
Patented Apr. 29, 1913.
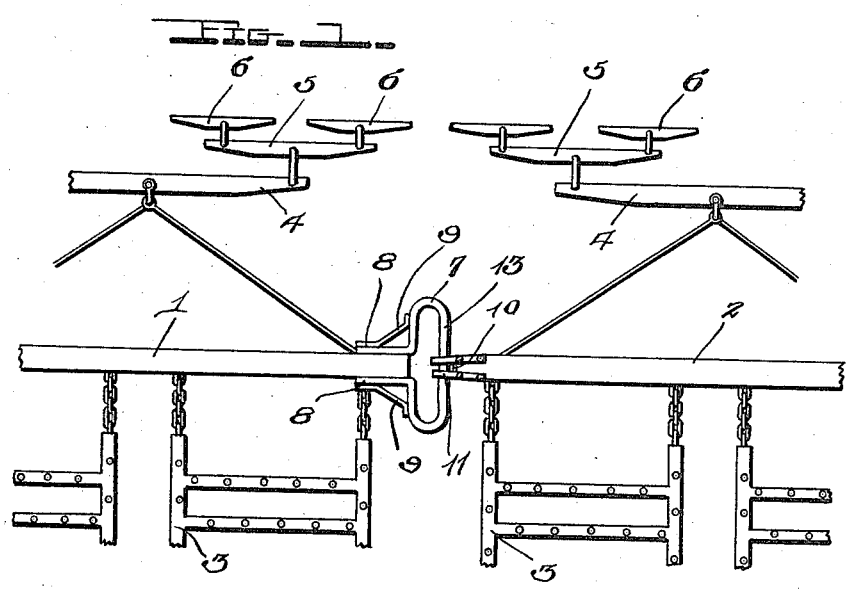
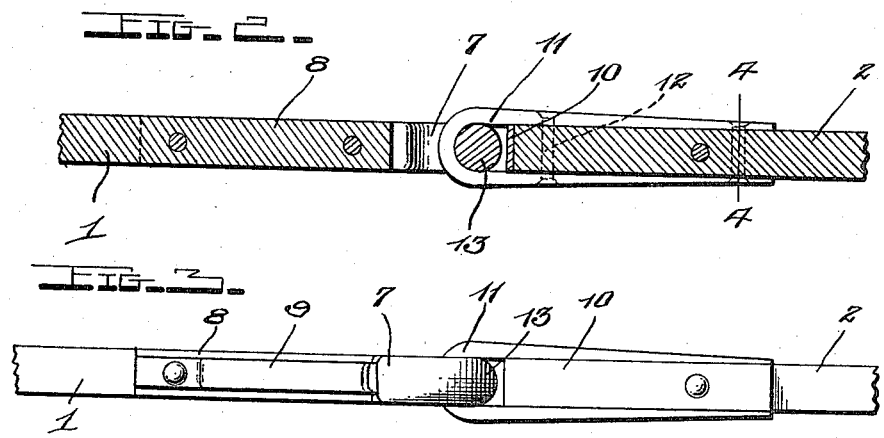
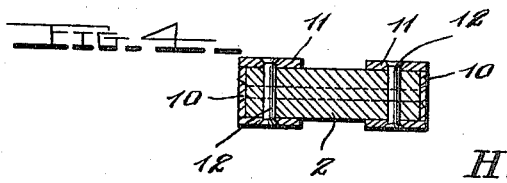
Witnesses
Chas. L. Grieshaver.
A. B. Norton.
Inventor
H. C. Odenrider,
By Watson E. Coleman
Attorney

UNITED STATES PATENT OFFICE.

HENRY C. ODENRIDER, OF WILBUR, WASHINGTON.

EQUALIZER.

1,060,013.  Specification of Letters Patent.  Patented Apr. 29, 1913.

Application filed June 8, 1912. Serial No. 702,510.

*To all whom it may concern:*

Be it known that I, HENRY C. ODENRIDER, a citizen of the United States, residing at Wilbur, in the county of Lincoln and State of Washington, have invented certain new and useful Improvements in Equalizers, of which the following is a specification, reference being had to the accompanying drawings.

This invention relates to new and useful improvements in equalizers and more particularly to an equalizer which is specially adapted for use upon gang harrows, the object being to equalize the draft between the harrow sections.

Another object of the invention is to provide a device of this character which will possess advantages in points of efficiency and durability, is inexpensive to manufacture and at the same time is simple in construction and operation.

With the above and other objects in view, the invention consists in the novel features of construction and the combination and arrangement of parts hereinafter more fully described, pointed out in the claims, and shown in the accompanying drawings in which, Figure 1 is a plan view showing my improved equalizer attached to a plurality of harrow sections. Fig. 2 is a longitudinal view. Fig. 3 is an edge view, and Fig. 4 is a sectional view on the line 4—4 of Fig. 2.

Referring more particularly to the drawings, 1 and 2 indicate the draw bars to which are secured the harrows 3. Secured to each of the draw bars and centrally arranged directly in front of the same are the evener bars 4 to which are secured the doubletrees 5 and secured to each end of the doubletrees are the swingletrees 6. Secured to the inner end of one of the draw bars is an elongated loop 7, the ends 8, of which are arranged in parallel relation and secured to each side of the bar 1. The outwardly extending ends of the loop 7 are securely braced by means of the brace members 9 having one of their ends secured to the loop and their other end rigidly secured to the arms 8.

A U shaped brace member 10 is secured to the inner end of the draw bar 2, and having its parallel portions secured to the longitudinal edges of said bar. U shaped bearing members are provided having their ends arranged upon the top and bottom sides of the bar 2 and rigidly secured thereto by means of the bolts 12, the intermediate portion of said bearing members extending beyond the inner end of the bar to form journals in which the unbroken side 13 of the loop 7 is mounted so as to adjustably and pivotally connect the inner ends of the draw bars 1 and 2.

From the above description taken in connection with the drawings it will be readily seen that, should the draft animals which are hitched to the bar 2 have more pulling power than the draft animals which are secured to the bar 1, the intermediate portion of the bearing members 12 will slide upon the closed side 13 of the loop 7 until the same reaches the end of the loop, the animals which are secured to the bar 2 will in this manner help the animals which are secured to the bar 1, along with their share of the load. If the draft animals which are hitched to the bar 1 should have more pulling power than the animals hitched to the bar 2, the operation of the device will be just the reverse, the intermediate portions of the bearing members 12 sliding upon the closed side 13 of the loop 7 to the rear end thereof.

While I have shown and described the preferred form of my invention, it will be obvious that various changes in the details of construction and in the proportions may be resorted to for successfully carrying my invention into practice without sacrificing any of the novel features or departing from the scope thereof.

What I claim is:—

1. The combination with the draw bars of a multiple harrow, of an elongated loop having its ends arranged in parallel relation and secured to the inner end of one of the bars, means for bracing the outwardly extending ends of said loop, U shaped members secured to the inner end of the other of said draw bars, and having their intermediate portions extending beyond the end of the draw bar to form journals in which is slidably mounted the closed side of the loop to adjustably and pivotally connect the inner ends of the draw bars.

2. The combination with the draw bars of a multiple harrow, of an elongated loop having its ends arranged in parallel relation and secured to the longitudinal edges of one of said bars at the other end thereof, braces having one of their ends secured to the outwardly extending ends of the loop and their other ends secured to said parallel ends, a U shaped brace member having its intermediate portion arranged across the inner end of the other of said bars and its ends secured to the longitudinal edges thereof, U shaped bearing members having their ends arranged upon the top and bottom sides of the second bar and secured thereto, and the intermediate portions of said bearing members extending beyond the inner end of the second bar to form journals in which is slidably mounted the closed side of said loop whereby the inner end of the bars are adjustably and pivotally connected together.

In testimony whereof I hereunto affix my signature in the presence of two witnesses.

HENRY C. ODENRIDER.

Witnesses:
FRANK M. HANSEN,
FRANDS MADSEN.

Copies of this patent may be obtained for five cents each, by addressing the "Commissioner of Patents, Washington, D. C."